United States Patent Office 3,357,943
Patented Dec. 12, 1967

3,357,943
STABILIZATION OF FORMALDEHYDE POLYMERS WITH THIAZOLIDIONE-2,4'S
Pierre Raoul, Epinay-sur-Orge, France, assignor to Produits Chimiques Pechiney-Saint-Gobain, Paris, France
No Drawing. Filed Feb. 18, 1965, Ser. No. 433,806
Claims priority, application France, Feb. 25, 1964, 965,052
8 Claims. (Cl. 260—45.8)

ABSTRACT OF THE DISCLOSURE

Formaldehyde polymers and copolymers having blocked end chains, stabilized by the presence of thiazolidione-2,4, represented by the formula,

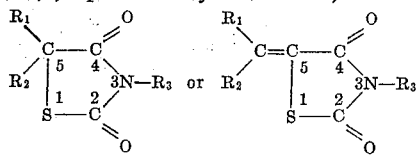

where $R_1$, $R_2$, R and $R_3$ are selected from hydrogen and alkyl, cycloalkyl, aryl, aralkyl, furyl, and thienyl radicals, the radicals being unsubstituted or substituted by hydroxyl, alkoxy, alkyl, alkylamino, amido and sulfamido groups.

---

This invention concerns the stabilization against heat of formaldehyde polymers having blocked chain ends and high molecular weight. Within the terms polymer of formaldehyde and formaldehyde polymers are included the polymers and copolymers of formaldehyde. By the term high molecular weight is meant polymers and copolymers in which the molecular weight of the polyformaldehyde is upward of about 30,000. By the term blocked chain ends is meant that the terminal hydroxy groups of the chains have been esterified, etherified, or themselves involved in the copolymerization, these three being standard methods of blocking. The invention also relates to new industrial products which are thermally stable high polymers of formaldehyde having blocked chain ends.

The blocking of the chain ends of polyformaldehyde as heretofore practiced has given material stability to heat but that stability has not been sufficient to permit the polymers to resist the temperatures which are employed during injection or extrusion molding, such that when these polymers are molded the substantial depolymerization occurs.

It is an object of the present invention to make polymers of the kind stated which have better resistance to heat, which can be molded by injection or extrusion, which can be reworked after cooling down from such temperatures, and which are superior to the polymers of formaldehyde heretofore known in their resistance to depolymerization. By virtue of this invention the field of use of these polymers of formaldehyde is materially extended into regions of higher temperature without introducing other sources of degradation.

The objects of the invention are accomplished, generally speaking, by a heat stabilized polymer of formaldehyde of high molecular weight and blocked chain ends containing a stabilizing amount of a thiazolidione-2,4.

Formula 1 is as follows:

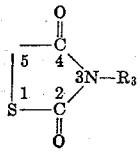

(1)

In this formula position 5 of the heterocyclic nucleus is occupied by one of the group consisting of

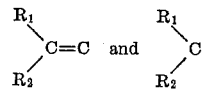

and $R_1$, $R_2$, and $R_3$ are from the group consisting of hydogen, alkyl, cycloalkyl, aryl, aralkyl, furyl and thienyl radicals, the radicals of which may bear hydroxy, alkoxy, alkyl, alkylamino, amido, and sulfamido substituents attached to carbon of the radical nucleus.

This group of compounds is very large. Thiazolidione-2,4 without substituents is itself a superior stabilizer compared to the substances known to the prior art, but the addition of substituents, of the type set forth to the nucleus produces yet further improvements, although sometimes adding materially to the cost. The performance of the unsubstituted compound is illustrated in Example 1 but when, in that formula, 1, 2, or 3 hydrogens are replaced by radicals cited, and when $R_1$ and $R_2$ are attached directly to $C_5$ there are produced compounds which are of yet superior stabilization. For example when $R_2$ and $R_3$ are hydrogen and $R_1$ is one of the radicals, the stabilizing action after 90 minutes is superior to that of the unsubstituted compound. Yet further improvement is achieved by substituting benzylidene for hydrogen at $R_1$ and n-butyl for hydrogen at $R_3$. Each type of the above radicals has been tested as a substituent. When the substituent radicals are themselves substituted, the groups hydroxy, alkoxy, alkylamino, amido and sulfamido may be used as the substituent. The presence of these secondary substituents still further increases the stabilizing action. For example, the presence of dimethylamino in Example 6 and of methoxy in Example 7 (see the table hereinafter) on the benzylidene radical give a stability after 90 minutes which is superior to that of the product which contains unsubstituted benzylidene (Example 3).

Experimentation has shown that if the substituted thiazolidiones-2,4 are better stabilizers than thiazolidione-2,4, the latter has the advantage of being more economic. When substituted members are wanted they can be prepared directly from the 2,4 compound by standard methods of substitution.

The tests have been established at 90 minutes and 222° C. because these temperatures show that the stabilized polymers may be worked several times with or without intermediate cooling without suffering damage. It is believed that no other polymers of formaldehyde have equivalent properties. Among the useful compounds falling within Formula 1 are the following, it being noted that they are merely representative compounds:

ethyl-5 thiazolidione-2,4;
dimethyl-5,5 thiazolidione-2,4;
benzyl-3-dimethyl-5,5-thiazolidione-2,4;
methyl-5 cyclohexyl-5 thiazolidione-2,4;
phenyl-3 methyl-5 cyclohexyl-5 thiazolidione-2,4;
methyl-3 diphenyl-5,5 thiazolidione-2,4;
methyl-3 p-dimethylaminobenzylidene-5 thiazolidione-2,4;
dihydroxy-2',4' benzylidene-5 thiazolidione-2,4;
cinnamylidene-5 thiazolidione-2,4;
thienylidene-5 thiazolidione-2,4;
dimethyl-3,5 thienyl-5 thiazolidione-2,4; and especially, thiazolidione-2,4;
cyclohexyl-5 thiazolidione-2,4;
isopropylidene-5 thiazolidione-2,4;
benzylidene-5 thiazolidione-2,4;
o-methoxybenzylidene-5 thiazolidione-2,4;
n-butyl-3 benzylidene-5 thiazolidione-2,4;
p-dimethaminobenzylidene-5 thiazolidione-2,4;
furfurylidene-5 thiazolidione-2,4.

Amounts of these stabilizers which should be added to the blocked polymers is related to the activity of the stabilizer itself and to the manner in which the polymers have been prepared, particularly when the properties of these unstabilized polymers vary from one sample to another as to their thermal stability. In most cases amounts as low as 0.001% and as high as 5% of the weight of the polymer or copolymer will be adequate and satisfactory. The preferred range lies between 0.05 and 2%.

Not only are these stabilizers efficient in themselves but they may be used in association with known stabilizers and when so used show an improvement in the result. They may in particular be advantageously associated with photostabilizers such as benzophenone and acetophenone as well as antioxidants such as the hydrazines, aromatic amines and the phenols, examples of which are butylidene-4,4' bis(methyl-3-tert-butyl-6 phenol) and methylene-2,2' bis(methyl-4-tert-butyl-6 phenol). These antioxidants protect the properties and reinforce them in the stabilizer, the resistance to heat of the polymers stabilized by the new stabilizers in association with antioxidants being superior to the sum of these effects taken separately.

The stabilizers are incorporated in blocked polymers by any known mixing techniques which permit mixing of the constituents. Among such techniques are mixing the dry constituents with agitation in a rotary apparatus, mixing the stabilizer in an inert volatile solvent, then suspending the blocked polymer in powder form in the solution, followed by evaporating the solvent.

The following examples are for the purpose of illustration without imposing limits to the generality of what is elsewhere herein stated and claimed.

Example 1

10 g. of a high polymer of formaldehyde, blocked by acetylation, were put into a rotating mixer into which were incorporated 10 mg. of thiazolidione-2,4 and 20 mg. of butylidene-4,4' bis(methyl-3-tert-butyl-6 phenol). This mixture was agitated for 3 hours. The product was tested for loss of weight at 222° C. in air. The test was made on 1 g. placed in a glass globe bearing a capillary tube. The globe was heated to 222° C. After 10 minutes of heating it was cooled and the loss of weight was measured. It was 3%. After 90 minutes heating at 222° C., the loss of weight was 22%.

An identical sample of blocked polyformaldehyde which had not been otherwise stabilized lost 9% after 10 minutes and 35% after 90 minutes.

Example 2

In a receptacle provided with an agitator there was dissolved 10 mg. of cyclohexyl-5 thiazolidione-2,4 and 20 mg. of butylidene-4,4' bis(methyl-3-tert-butyl-6 phenol) in 50 cc. of pure anhydrous methanol as the solvent. 10 g. of blocked (acetylated) polyformaledhyde were added and agitated for 5 hours. The methanol was then completely evaporated while continuing the agitation. The loss of weight as determined in Example 1 was ascertained; after 10 minutes it was 4% and after 90 minutes it was 19%.

A like sample of the same blocked polyformaldehyde otherwise unstabilized was similarly tested and lost 9% in 10 minutes and 35% in 90 minutes.

Examples 3–8

The following table shows the results of stabilizing blocked polyformaldehyde (acetylated) by means of types of the new stabilizing agents, the results of Examples 1 and 2 are also included in this table for purposes of mutual comparison and the first space in the table is occupied by the test of blocked but otherwise unstabilized polyformaldehyde:

| Ex. No. | 0.1% by weight of stabilizer | Percent losss in weight after— | |
|---|---|---|---|
| | | 10 min. at 222° C. | 90 min. at 222° C. |
| | None | 9 | 35 |
| 1 | Thiazolidione-2,4 | 3 | 22 |
| 2 | Cyclohexyl-5 thiazolidione-2,4 | 4 | 19 |
| 3 | Benzylidene-5 thiazolidione-2,4 | 2 | 17 |
| 4 | Furfurylidene-5 thiazolidione-2,4 | 5 | 23 |
| 5 | n-Butyl-3 benzylidene-5 thiazolidione-2,4 | 2 | 14 |
| 6 | p-Dimethylaminobenzylidene-5 thiazolidione-2,4 | 3 | 16 |
| 7 | o-Methoxybenzylidene-5 thiazolidione-2,4 | 2 | 16 |
| 8 | Isopropylidene-5 thiazolidione-2,4 | 3 | 17 |

A sample of the same blocked polyformaldehyde was stabilizised with 1% by weight of a terpolymer prepared from ε-caprolactam, hexamethylene diamine, sebacic acid, and adipic acid, and 0.2% by weight of butylidene-4,4' bis(methyl-3-tert-butyl-6 phenol). The loss was 3% after 10 minutes and 13% after 90 minutes at 222° C.

It was established that to obtain an equivalent stabilization from the terpolymer alone it is necessary to add 10 times the amount of terpolymer than thiazolidione-2,4 and its derivatives.

Example 9

For purposes of comparison blocked polyformaldehyde was stabilized by means of the novel stabilizers and with the same antioxidant used in Example 1, on the one hand, and on the other hand, utilizing the same stabilizers without antioxidant. The following table gives the results:

| 0.1% by weight of stabilizer | Percent loss in weight after 10 min. at 222° C. | | Percent loss in weight after 90 min. at 222° C. | |
|---|---|---|---|---|
| | Without antioxidant | With antioxidant | Without antioxidant | With antioxidant |
| n-Butyl-3 benzylidene-5 thiazolidione-2,4 | 7 | 2 | 20 | 14 |
| p-Dimethylaminobenzylidene-5 thiazolidione-2,4 | 6 | 3 | 18 | 16 |
| o-Methoxybenzylidene-5 thiazolidione-2,4 | 8 | 2 | 20 | 16 |

This table shows the favorable effect of the antioxidant.

Examples 10–11

A Lodige mixer comprises a horizontal cylinder within which rotates a shaft carrying spokes prolonged as spatulas. Into this mixer there were put 10 g. of a co-polymer of trioxane and dioxolane containing 1% of dioxolane into which were incorporated 10 mg. of n-butyl-3 benzylidene-5 thiazolidione-2,4 (Example 10) and 10 mg. of p-dimethyl-aminobenzylidene-5 thiazolidione-2,4 (Example 11), and 20 mg. of butylidene-4,4' bis(methyl-3-tert-butyl-6 phenol) which was included in Examples 10 and 11 as an antioxidant. The mixture was agitated for 3 hours and subjected to tests for loss of weight at 222 C. in air. The results are set forth in the following table:

| Ex. No. | 0.1% by weight of stabilizer | Percent loss in weight after— | |
|---|---|---|---|
| | | 10 min. at 222° C. | 90 min. at 222° C. |
| | None | 9 | 21 |
| 10 | n-Butyl-3 benzylidene-5 thiazolidione-2,4 | 8 | 12 |
| 11 | p-Dimethylaminobenzylidene-5 thiazolidione-2,4 | 7 | 8 |

It will be observed that the loss at 222° C. after 90 minutes was only 8% which is less than 25% of the loss of the blocked but unstabilized polymer.

Some of the other advantages can be perceived by a study of the tabulated tests. From a practical point of view the invention makes possible an economic use of polyformaldehyde by methods involving injection and extrusion. It also makes available to the practicing art stabilized polyformaldehyde polymers which have superior resistance to heat, and which can be reworked at high temperature after one or more previous workings. A great advantage is in the conversion of material during working, the least advantage achieved being 37% saving of material and the greatest recorded in this specification being 77%, at 90 minutes and 222° C.

As many apparently widely different embodiments of the present invention may be made without departing from the spirit and scope thereof, it is to be understood that the invention is not limited to the specific embodiments.

What is claimed is:

1. A heat stabilized polymer of formaldehyde of high molecular weight and blocked chain ends containing a stabilizing amount of a compound represented by

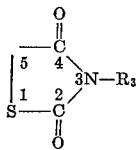

in which position 5 is occupied by one of the group

and

and $R_1$, $R_2$, and $R_3$ are from the class consisting of hydrogen, alkyl, cycloalkyl, aryl, aralkyl, thienyl and furyl radicals, the radicals of which may bear hydroxy, alkoxy, alkyl, alkylamino, amido, and sulfamido substituents attached to carbon of the radical nucleus.

2. A polymer according to claim 1 in which $R_2$ and $R_3$ are hydrogen and $R_1$ is one of said radicals.

3. A polymer according to claim 1 in which the stablizer is benzylidene-5 n-butyl-3 thiazolidione-2,4.

4. A polymer according to claim 1 in which at least one of $R_1$, $R_2$ and $R_3$ is a said radical.

5. A polymer according to claim 1 in which the stabilizer is p-dimethylamino-benzylidene-5 thiazolidione-2,4.

6. A polymer according to claim 1 in which the stabilizer is o-methoxy-benzylidene-5 thiazolidione-2,4.

7. A polymer according to claim 1 in which the stabilizer is thiazolidione-2,4.

8. A polymer according to claim 1 including an antioxidant selected from the group consisting of hydrazine, aromatic amines and phenols.

References Cited

UNITED STATES PATENTS 3,219,621   11/1965   Prichard _____ 260—45.8

DONALD E. CZAJA, *Primary Examiner.*

LEON J. BERCOVITZ, *Examiner.*

M. J. WELSH, *Assistant Examiner.*